(12) United States Patent
Chen et al.

(10) Patent No.: US 11,806,870 B2
(45) Date of Patent: Nov. 7, 2023

(54) DIFFERENTIAL COMPLIANT DISPLACEMENT REDUCER WITH OUTPUT IN SAME DIRECTION OR REVERSE DIRECTION OF INPUT

(71) Applicant: XI'AN JIAOTONG UNIVERSITY, Shaanxi (CN)

(72) Inventors: Guimin Chen, Shaanxi (CN); Lingling Li, Shaanxi (CN); Houqi Wu, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 40 days.

(21) Appl. No.: 17/573,500

(22) Filed: Jan. 11, 2022

(65) Prior Publication Data
US 2022/0379465 A1    Dec. 1, 2022

(30) Foreign Application Priority Data
May 28, 2021    (CN) .......................... 202110595304.7

(51) Int. Cl.
*H02N 2/00*    (2006.01)
*B25J 9/10*    (2006.01)

(52) U.S. Cl.
CPC .......... *B25J 9/1065* (2013.01); *H02N 2/0005* (2013.01)

(58) Field of Classification Search
CPC .. H02N 2/0005; H02N 2/043; G03F 7/70725; G03F 7/70758; B25J 7/00
See application file for complete search history.

(56) References Cited

U.S. PATENT DOCUMENTS

| | | | | |
|---|---|---|---|---|
| 10,862,406 | B2 * | 12/2020 | Behdinan ........... | H10N 30/2045 |
| 2014/0306576 | A1 * | 10/2014 | Ervin ........................ | F16F 7/00 267/136 |

* cited by examiner

*Primary Examiner* — Emily P Pham (57) ABSTRACT

The invention discloses a modular differential compliant displacement reducer with output in same direction or reverse direction of input. The modular differential compliant displacement reducer includes a forward motion module, a reverse motion module and an actuator, and two ends of the forward motion module are respectively connected to one end of the reverse motion module. Differential superposition of displacement is achieved through combination of the forward motion module and the reverse motion module, a large displacement reduction ratio can be obtained, and therefore the resolution ratio and precision of motion are greatly improved. The reducer can be matched with a macro-motion platform, and large-range and ultrahigh-precision motion positioning is achieved.

10 Claims, 6 Drawing Sheets

DIFFERENTIAL COMPLIANT DISPLACEMENT REDUCER WITH OUTPUT IN SAME DIRECTION OR REVERSE DIRECTION OF INPUT

CROSS-REFERENCE TO RELATED APPLICATIONS

The application requires the rights and interests of the priority of the Chinese patent application which is submitted to the China National Intellectual Property Administration on May 28, 2021 and has the application number of 2021105953047, and the Chinese patent application is integrated through reference.

TECHNICAL FIELD

The invention belongs to the field of precision driving and transmission, and particularly relates to a modular differential compliant displacement reducer with output in same direction or reverse direction of input.

BACKGROUND

The nanometer positioning technology is the basis for realizing nanometer control and nanometer measurement. A piezoelectric stack actuator is generally adopted to directly drive and position, or a displacement amplification mechanism (such as a bridge type or a lever type) is utilized to further amplify the displacement on the basis of the piezoelectric stack actuator, and the positioning mode generally can only reach the motion precision of dozens of nanometers or even hundreds of nanometers.

Along with the development of science and technology, the fields of semiconductor technology, spaceflight science and technology, optical and optoelectronic engineering, bioengineering and the like have higher and higher requirements on positioning precision. However, an existing positioning mode and a displacement mechanism thereof need to be further improved so as to meet high motion precision.

SUMMARY

The invention aims to provide a modular differential compliant displacement reducer with output in same direction or reverse direction of input so as to solve the problem.

In order to achieve the purpose, the following technical solution is adopted:

The modular differential compliant displacement reducer with output in the same direction or reverse direction of input includes a forward motion module, a reverse motion module and an actuator; both of the forward motion module and the reverse motion module are provided with an input end and an output end; an output end of the forward motion module is compliantly connected with an input end of the reverse motion module, and the output of the forward motion module is used as the input of the reverse motion module; an input end of the forward motion module is an actuator input end, and an output end of the reverse motion module is a reducer output end; and displacement input provided by the actuator is in the same direction or reverse direction of displacement output of an output end of the reverse motion module.

Furthermore, the forward motion module and the reverse motion module are of a symmetrical structure; the forward motion module is a double-lever module, and the reverse motion module is a half-bridge module or a double-Scott-Russell module.

Furthermore, the output end of the forward motion module and the input end of a reverse motion module are compliantly connected through a compliant hinge with notches in the two sides, or the output end of the forward motion module is directly connected with a compliant beam of the input end of the reverse motion module.

Furthermore, the double-lever module includes a lever input end used as an input end of the forward motion module and two lever mechanisms, and the two lever mechanisms are symmetrically arranged on the two sides of the lever input end.

Furthermore, the lever mechanism includes a lever output end used as the output end of the forward motion module and a lever supporting block, the lever supporting block is arranged on the outer side or the inner side of the lever input end, one end of the lever supporting block is fixed, and the other end is connected with the lever output end through a compliant hinge.

Furthermore, the half-bridge module includes a half-bridge output end used as the output end of the reverse motion module and compliant branch chains used as the input end of the reverse motion module, and the two compliant branch chains are symmetrically arranged on the two sides of the half-bridge output end.

Furthermore, the compliant branch chain is a lumped compliance type branch chain or a distributed compliance type branch chain, compliant hinges are arranged at the two ends of the lumped compliance type branch chain, the compliant hinges are horizontally, vertically or obliquely arranged, and the distributed compliance type branch chain is a whole section of compliant beam, and the compliant beam is a long beam or a reed.

Furthermore, the double-Scott-Russell module includes a Scott-Russell output end used as the output end of the reverse motion module, two Scott-Russell mechanisms and a Scott-Russell connecting block;

the two Scott-Russell mechanisms are symmetrically arranged on the two sides of the Scott-Russell output end, and the lower ends of the two Scott-Russell mechanisms are connected through the Scott-Russell connecting block; in the Scott-Russell mechanism, the input end of the reverse motion module is connected with the Scott-Russell output end and the output end of the forward motion module at the same time; and the Scott-Russell mechanism includes two branches, one branch used as the input end of the reverse motion module is a long branch, the other branch is a short branch, and the two ends of each branch are compliant hinges; connecting lines of three ends of the Scott-Russell mechanism form a right triangle, and meanwhile a connecting end of the short branch and the long branch is arranged at the midpoint of a connecting line of the two ends of the long branch.

Furthermore, when the counterclockwise direction is positive, and the forward motion module is a double-lever module, $\theta 1$ is recorded as an angle from the horizontal line to the connecting line of the lever supporting block and a joint of the forward motion module and the reverse motion module; when the reverse motion module is a half-bridge module, $\theta 2$ is recorded as an angle from the horizontal line to a compliant branch chain in the half-bridge module; when the reverse motion module is a half-bridge module, a joint of the input end of the reverse motion module and the output end of the reverse module is connected with a joint of the input end of the reverse motion module and the output end of the forward motion module, and θ3 is recorded as an angle from the horizontal line to the connection line; θ1 and θ2 are in the range of 0-90 degrees or 90-180 degrees at the same time, and θ1 and θ3 are in the range of 90-180 degrees at the same time.

Furthermore, one end of the actuator is fixed, the other end of the actuator is fixedly connected with the input end of the forward motion module, and the actuator provides linear input to enable the input end of the forward motion module to move linearly; the actuator is a piezoelectric stack actuator, a magnetostrictive actuator or a linear voice coil motor.

In addition, the invention further discloses a modular differential compliant displacement reducer with output in same direction or reverse direction of input, including:

an actuator (11), a forward motion module (1) and a reverse motion module (2) which are sequentially arranged from bottom to top; wherein both of the forward motion module (1) and the reverse motion module (2) are provided with an input section and an output section;

the forward motion module (1) is compliantly connected with the input section of the reverse motion module (2) through the output section of the forward motion module (1), and the output of the forward motion module (1) is used as the input of the reverse motion module (2);

the actuator (11) provides displacement, and the displacement is input to the input section of the forward motion module (1); and the input displacement provided by the actuator (11) is in the same direction or reverse direction of displacement output by the output section of the reverse motion module (2). Compared with the prior art, the invention has the following technical effects:

differential superposition of displacement is achieved through combination of the forward motion module and the reverse motion module, a large displacement reduction ratio can be obtained, and therefore the resolution ratio and precision of motion are greatly improved; the reducer can be matched with a macro-motion platform, and large-range and ultrahigh-precision motion positioning is achieved.

The structure can be integrally machined, the structure is simple, and assembly is not needed.

DETAILED DESCRIPTION

The invention is further described by various embodiments according to the following drawings.

Figure 1A:
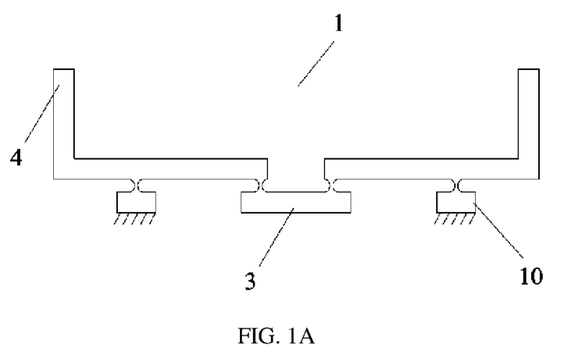
FIGS. 1A-1C are schematic diagrams of a concentrated compliant structure of the invention, in which θ1 and θ2 are in a range of 0-90 degrees at the same time and compliant hinges are orthogonally arranged.
Figure 1B:
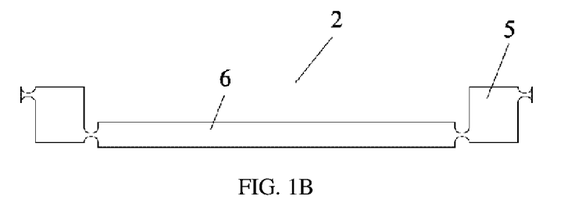
Figure 1C:
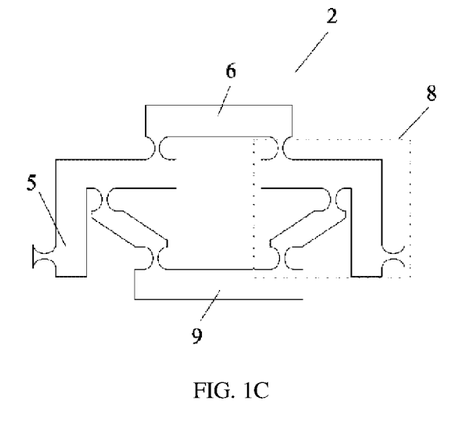

Please refer to FIG. 1A to FIG. 8, and particularly, with FIGS. 1A-1C as an example, in one embodiment, the invention discloses a modular differential compliant displacement reducer with output in the same direction or reverse direction of input, which is characterized by including a forward motion module 1, a reverse motion module 2 and an actuator 11, both of the forward motion module 1 and the reverse motion module 2 are provided with an input end and an output end; the input end 3 of the forward motion module is also the input end of the actuator; the output end 6 of the reverse motion module is also the output end of the reducer; the output end 4 of the forward motion module is compliantly connected with the input end 5 of the reverse motion module, and the output of the forward motion module 1 is used as the input of the reverse motion module 2.

It can be understood that the same direction or the reverse direction belongs to a collinear situation. The inventive concept of the invention can be broadened to a collinear differential compliant displacement reducer.

In another embodiment, the displacement input provided by the actuator 11 is in the same direction or reverse direction of the displacement output of the output end 6 of the reverse motion module.

In another embodiment, both of the forward motion module 1 and the reverse motion module 2 are of a symmetrical structure. The forward motion module 1 is a double-lever module, and the reverse motion module 2 is a half-bridge module or a double-Scott-Russell module.

In another embodiment, the output end 4 of the forward motion module is compliantly connected with the input end 5 of the reverse motion module through a compliant hinge with notches symmetrically formed in the two sides, or the output end 4 of the forward motion is directly connected with a compliant beam of the input end 5 of the reverse motion module.

In another embodiment, FIG. 1A is a double-lever module. The double-lever module includes a lever input end used as the input end 3 of the forward motion module and two lever mechanisms, and the two lever mechanisms are symmetrically arranged on the two sides of the lever input end.

In another embodiment, the lever mechanism includes a lever output end used as the out put end 4 of the forward motion module and a lever supporting block 10, the lever supporting block 8 is arranged on the outer side or the inner side of the lever input end, one end of the lever supporting block 8 is fixed, and the other end of the lever supporting block 8 is connected with the lever output end through a compliant hinge.

In another embodiment, FIG. 1B is a half-bridge module. The half-bridge module includes a half-bridge output end used as an output end 6 of the reverse motion module and compliant branch chains used as an input end 5 of the reverse motion module, and the two compliant branch chains are symmetrically arranged on the two sides of the half-bridge output end.

In another embodiment, the compliant branch chain is a lumped compliance type branch chain or a distributed compliance type branch chain, compliant hinges are arranged at two ends of the lumped compliance type branch chain, the compliant hinges are horizontally, vertically or obliquely arranged, the distributed compliance type branch chain is a whole section of compliant beam, and the compliant beam is a long beam or a reed.

In another embodiment, FIG. 1C is a double Scott-Russell module. The double Scott-Russell module includes a Scott-Russell output end used as the output end 6 of the reverse motion module, two Scott-Russell mechanisms 8 and a Scott-Russell connecting block 9; the two Scott-Russell mechanisms (8) are symmetrically arranged on the two sides of the Scott-Russell output end, and the lower ends of the two Scott-Russell mechanisms 8 are connected through the Scott-Russell connecting block 9; in the Scott-Russell mechanism 8, the input end 5 of the reverse motion module is connected with the Scott-Russell output end (namely, the output end 6 of the reverse module) and the output end (4) of the forward motion module at the same time.

In another embodiment, the Scott-Russell mechanism 8 includes two branches, one branch used as the input end 5 of the reverse motion module is a long branch, the other branch is a short branch, and the two ends of each branch are compliant hinges; connecting lines of three ends of the Scott-Russell mechanism 8 form a right triangle, and meanwhile a connecting end of the short branch and the long branch is arranged at the midpoint of a connecting line of the two ends of the long branch.

In another embodiment, when the counterclockwise direction is positive, and the forward motion module 1 is a double-lever module, $\theta 1$ is recorded as an angle from the horizontal line to the connecting line of the lever supporting block (10) and a joint of the forward motion module 1 and the reverse motion module 2; when the reverse motion module 2 is a half-bridge module, $\theta 2$ is recorded as an angle from the horizontal line to a compliant branch chain in the half-bridge module; when the reverse motion module 2 is a half-bridge module, a joint of the input end 5 of the reverse module and the output end 6 of the reverse module is connected with a joint of the input end 5 of the reverse module and the output end 4 of the forward module, and $\theta 3$ is recorded as an angle from the horizontal line to the connection line; $\theta 1$ and $\theta 2$ are in the range of 0-90 degrees or 90-180 degrees at the same time, and $\theta 1$ and $\theta 3$ are in the range of 90-180 degrees at the same time.

In another embodiment, one end of the actuator 11 is fixed, the other end of the actuator 11 is fixedly connected with the input end 3 of the forward motion module, and the actuator 11 provides linear input to enable the input end 3 of the forward motion module to move along a straight line; the actuator 11 is a piezoelectric stack actuator, a magnetostrictive actuator or a linear voice coil motor.

In another embodiment, after the actuator 11 provides linear displacement input $\delta$, the two ends of the reverse motion module 2 generate displacement $\Delta y1$ in the Y direction relative to the fixed position of the reverse module, the output end generates displacement $\Delta y2$ in the Y direction relative to the two ends of the forward motion module 1, the $\Delta y1$ and the $\Delta y2$ are opposite in direction, and the actual displacement of the output end in the Y direction is $\Delta y=|\Delta y1-\Delta y2|$. In other words, the displacement of the forward motion module 1 and the displacement of the reverse motion module 2 in the longitudinal direction are offset, and large-scale reduction of the input displacement of the actuator 11 can be achieved. By changing design parameters of the forward motion module 1 and the reverse motion module 2, displacement reduction of any proportion can be obtained.

Other embodiments are as follows:

Embodiments 1

Figure 2:
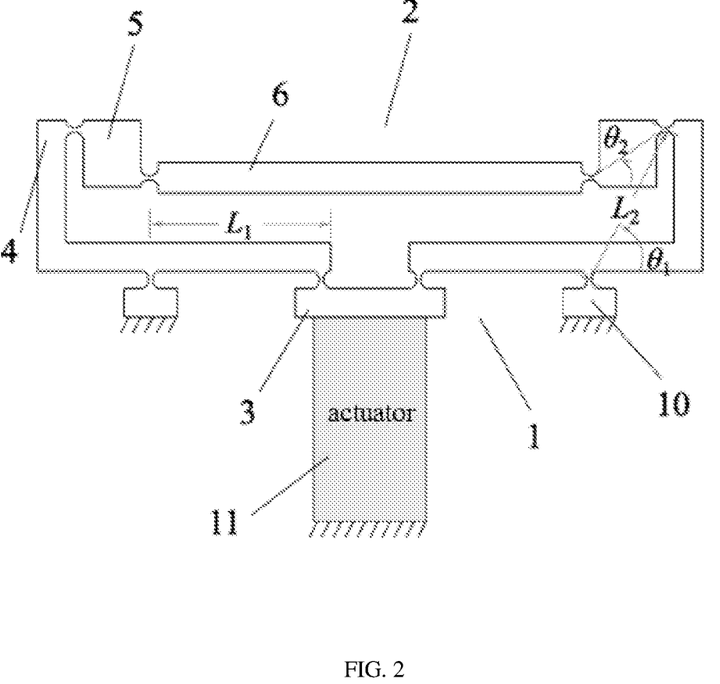
FIG. 2 is a schematic diagram of a lumped compliance type structure of the invention, in which the forward motion module 1 and the reverse motion module 2 are a double-lever module and a half-bridge module respectively, θ1 and θ2 are in a range of 0-90 degrees at the same time, and compliant hinges are orthogonally arranged.

In the embodiment of FIG. 2, the forward motion module 1 and the reverse motion module 2 of the invention are a double-lever module and a half-bridge module respectively, and the double-lever module and the half-bridge module are connected through compliant hinges.

The double-lever module includes a lever input end used as an input end 3 of the forward motion module and two lever mechanisms, and the two lever mechanisms are symmetrically arranged on the two sides of the lever input end.

The lever mechanism includes a lever output end used as an output end 4 of the forward motion module and a lever supporting block 10, the lever supporting block 10 is arranged on the outer side of the lever input end, one end of the lever supporting block 8 is fixed, and the other end of the lever supporting block 8 is connected with the lever output end through a compliant hinge.

The half-bridge module includes a half-bridge output end used as an output end 6 of the reverse motion module and compliant branch chains used as an input end 5 of the reverse motion module, and the two compliant branch chains are symmetrically arranged on the two sides of the half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed.

The compliant branch chains in the half-bridge module in FIG. 2 are lumped compliance type compliant branch chains, the compliant hinges used by the mechanism are only horizontally and vertically arranged, and $\theta 1$ and $\theta 2$ are in the range of 0-90 degrees at the same time.

Meanwhile, the input end 3 of the forward motion module is the input end of the actuator, and the output end 6 of the reverse motion module is the output end of the mechanism.

The lever module and the half-bridge module generate differential motion in the Y direction.

Figure 3:
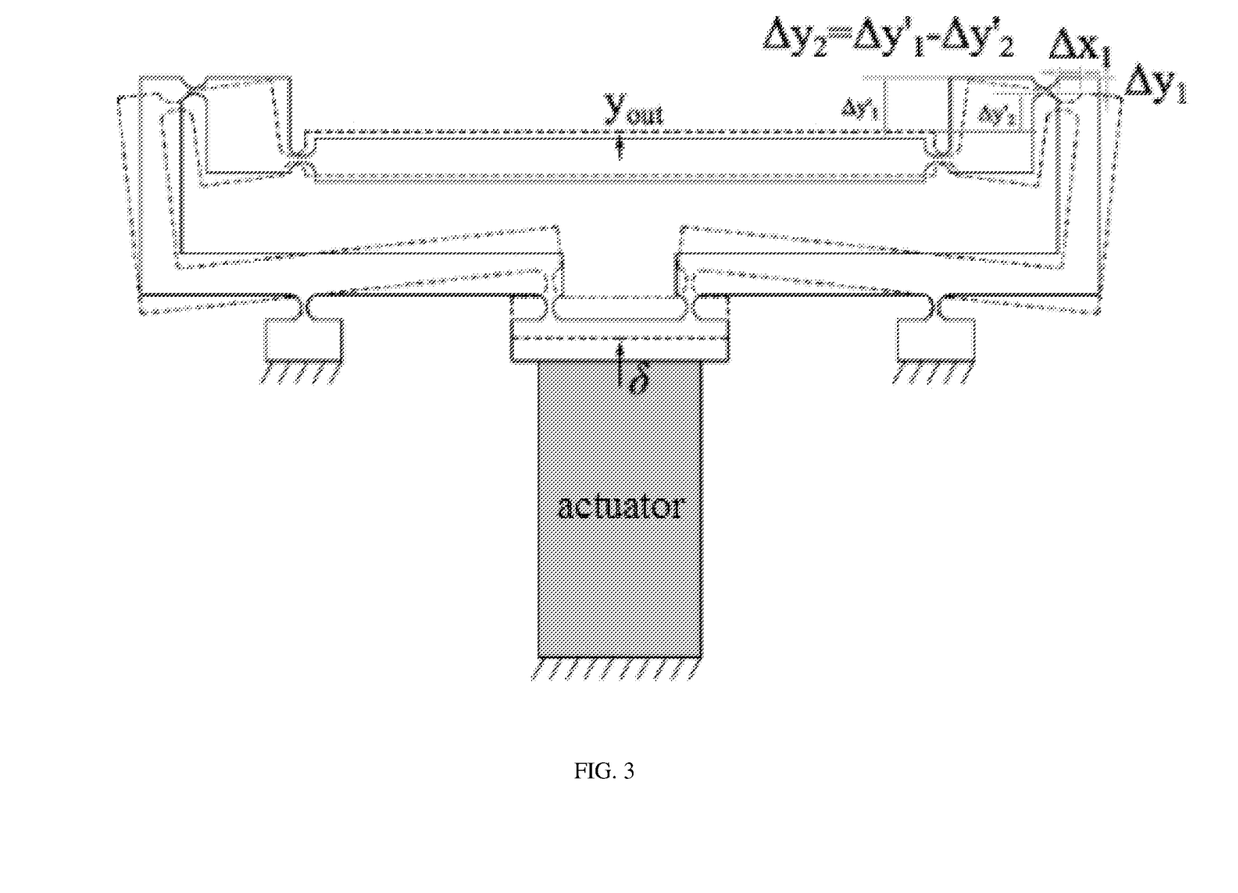
FIG. 3 is a schematic diagram of lumped compliance type motion of the invention, in which the forward motion module 1 and the reverse motion module 2 are a double-lever module and a half-bridge module respectively, θ1 and θ2 are in a range of 0-90 degrees at the same time, and compliant hinges are orthogonally arranged.

The working principle of the invention is as follows: as shown in FIG. 3, firstly, voltage is pre-applied to the actuator 11 connected with the lever input end, the actuator 11 generates input displacement δ in the Y direction, and the input displacement is transmitted to a connecting end the output end of the lever module and the compliant branch chain of the half-bridge module through the lever input end; the displacement Δx1 in the X direction and the displacement Δy1 in the Y direction are generated at the connecting end, the displacement Δx1 enables the half-bridge output end to output the displacement Δy2 in the Y direction relative to the two ends of the half-bridge module, the displacement directions of the Δy1 and the Δy2 are opposite, a small output displacement yout is obtained after superposition, and reduction of the input displacement is achieved.

The linear distance between the lever input end and the lever supporting block 10 is recorded as L1, and the linear distance between the connecting end of the lever module and the half-bridge module and the lever supporting block 10 is recorded as L2.

For the lever module, when the actuator 11 inputs the longitudinal displacement of δ, the transverse displacement Δx1 generated by the connecting end of the lever module and the half-bridge module is approximately equal to $\delta L2 \sin(\theta 1)/L1$, and meanwhile, the longitudinal displacement Δy1 is approximately equal to $\delta L2 \cos(\theta 1)/L1$.

For the half-bridge module, the transverse displacement Δx1 makes the longitudinal distance between the half-bridge output end and the two ends of the half-bridge module before and after deformation differ by Δy2 which is approximately equal to $\delta L2 \sin(\theta 1)/L1/\tan(\theta 2)$.

The output end of the whole mechanism is a half-bridge output end, the output displacement of the half-bridge output end relative to a base is yout, when Δy2 is larger than Δy1, yout is equal to Δy2−Δy1, and otherwise, yout is equal to Δy1−Δy2.

Figure 4:
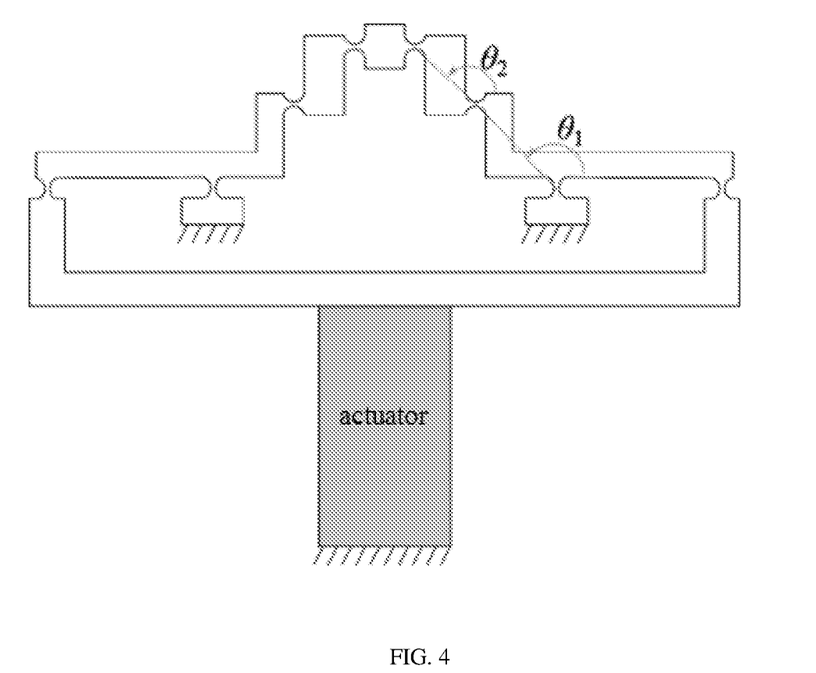
FIG. 4 is a schematic diagram of a lumped compliance type structure of the invention, in which the forward motion module 1 and the reverse motion module 2 are a double-lever module and a half-bridge module respectively, θ1 and θ2 are in a range of 90-180 degrees at the same time, and compliant hinges are orthogonally arranged.

As shown in FIG. 4, when the lever supporting block 10 is arranged on the inner side of the lever input end and the lever input end is located on the outermost layer of the lever mechanism, the bending direction of the half-bridge module is opposite to the direction of the half-bridge module in FIG. 2, but the working principle of the mechanism shown in the FIG. 4 is the same as that of the mechanism shown in FIG. 2.

Figure 7:
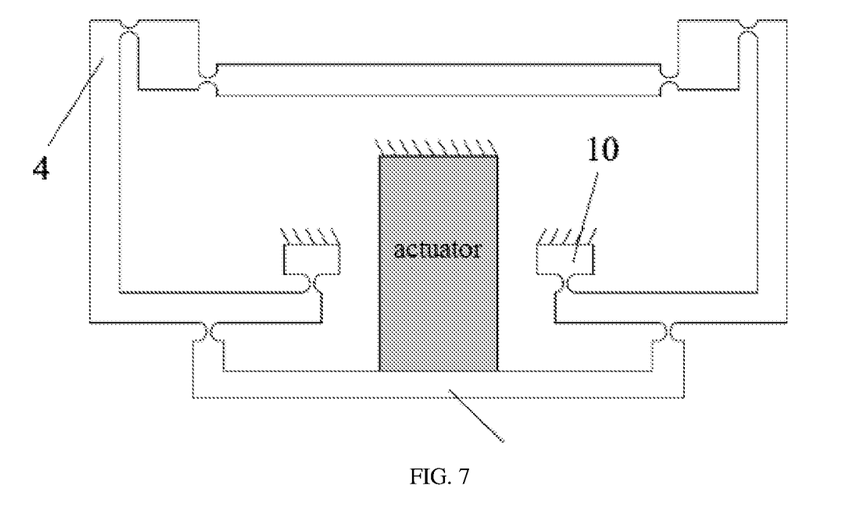
FIG. 7 is a structure schematic diagram that the forward motion module 1 and the reverse motion module 2 of the invention are a double-lever module and a half-bridge module respectively, and the lever supporting block is arranged on the inner side of the lever input end.

As shown in FIG. 7, when the lever supporting block 10 is arranged on the inner side of the lever input end and the two ends of the lever input end are connected with the non-two-end positions of the lever mechanism, the input displacement direction of the actuator 11 is opposite to that of FIG. 2, but the working principle of the mechanism shown in FIG. 7 is the same as that of the mechanism shown in FIG. 2.

Figure 5:
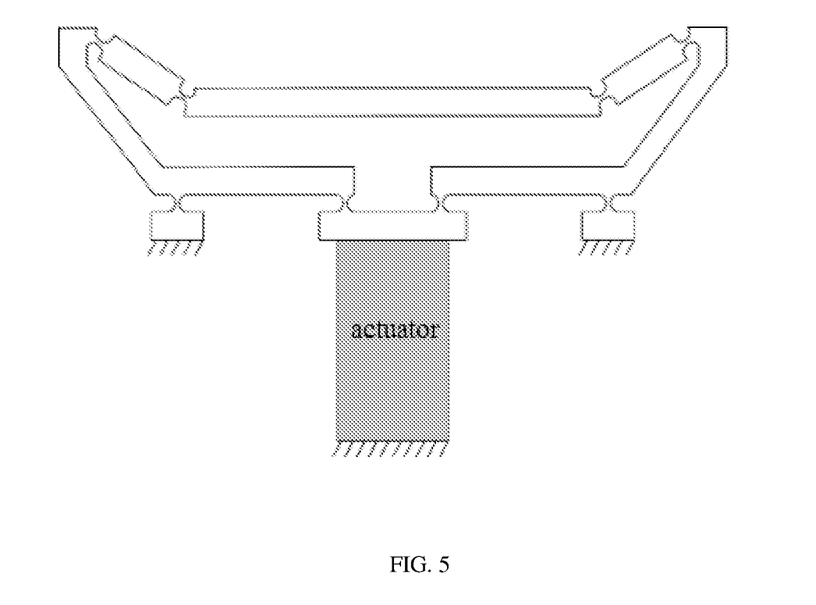
FIG. 5 is a schematic diagram of a lumped compliance type structure of the invention, in which the forward motion module 1 and the reverse motion module 2 are a double-lever module and a half-bridge module respectively, θ1 and θ2 are in a range of 0-90 degrees at the same time, and compliant hinges are obliquely arranged.
Figure 6:
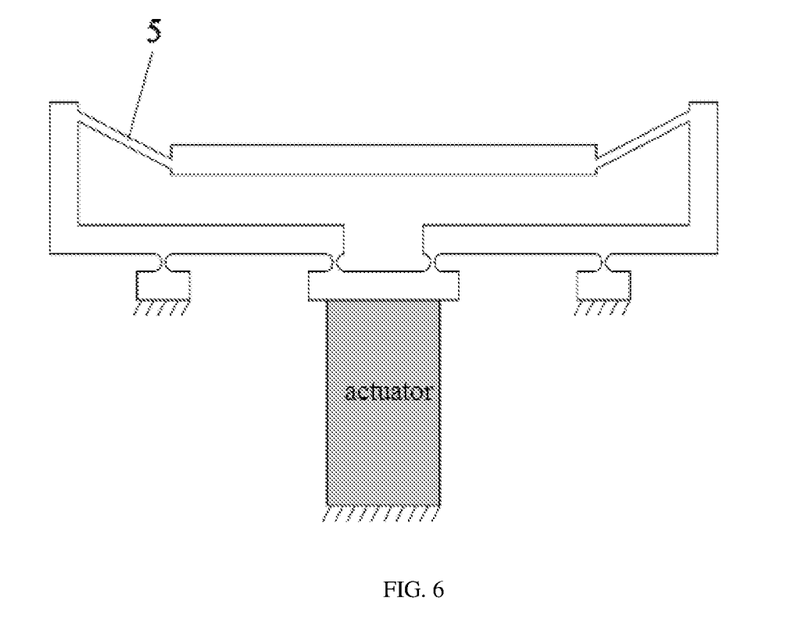
FIG. 6 is a schematic diagram of a distributed compliance type structure, in which the forward motion module 1 and the reverse motion module 2 are a double-lever module and a half-bridge module respectively.

The working principles of other differential displacement reducers (as shown in FIG. 5 and FIG. 6) are the same as that of the lumped compliance type differential displacement reducer in FIG. 2.

Embodiment 2

Figure 8:
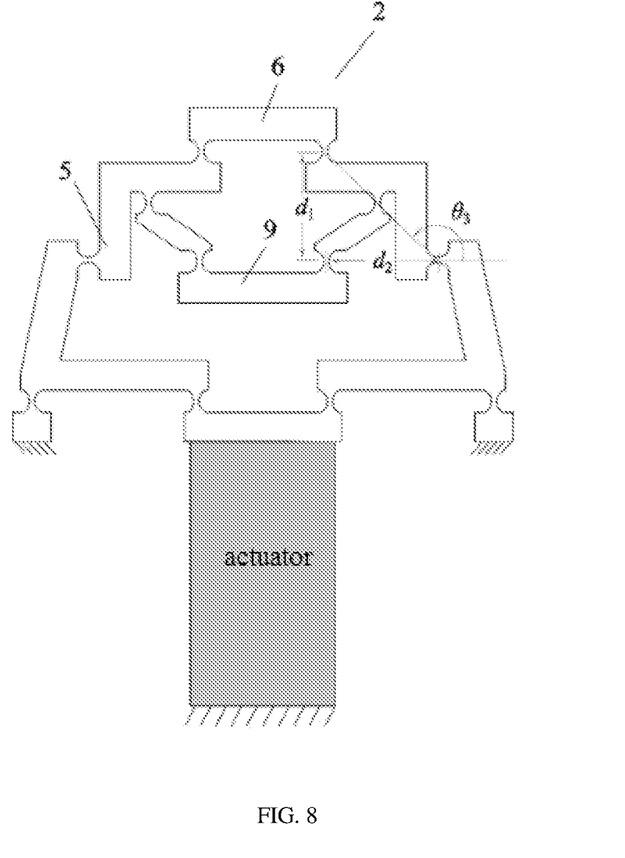
FIG. 8 is a structure schematic diagram that the forward motion module 1 and the reverse motion module 2 of the invention are a double-lever module and a double-Scott-Russell module respectively.

In the embodiment of FIG. 8, the forward motion module 1 and the reverse motion module 2 are a lever module and a double-Scott-Russell module respectively, and the lever module and the double-Scott-Russell module are connected through a compliant hinge.

The double-lever module includes a lever input end used as the input end 3 of the forward motion module and two lever mechanisms are symmetrically arranged on the two sides of the lever input end.

The lever mechanism includes a lever output end used as the out put end 4 of the forward motion module and a lever supporting block 10, the lever supporting block 10 is arranged on the outer side of the lever input end, one end of the lever supporting block 8 is fixed, and the other end of the lever supporting block 8 is connected with the lever output end through a compliant hinge.

The double Scott-Russell module includes a Scott-Russell output end, two Scott-Russell mechanisms 8 and a Scott-Russell connecting block 9, wherein the Scott-Russell output end is used as an output end 6 of the reverse motion module; the two Scott-Russell mechanisms 8 are symmetrically arranged on the two sides of the Scott-Russell output end, and the lower ends of the two Scott-Russell mechanisms 8 are connected through the Scott-Russell connecting block 9. A structure in the Scott-Russell mechanism 8, which is simultaneously connected with the Scott-Russell output end (namely, the output end 6 of the reverse module) and the output end 4 of the forward motion module, is the input end 5 of the reverse motion module.

The θ1 and the θ3 in FIG. 8 are both in the range of 90-180 degrees.

Meanwhile, the lever input end is the actuator input end, and the Scott-Russell output end is the reducer output end.

The lever module and the double Scott-Russell module generate differential motion in the Y direction.

The working principle of the invention is as follows: as shown in FIG. 8, firstly, voltage is pre-applied to the actuator 11 connected with the lever input end, the actuator 11 generates input displacement δ in the Y direction, the input displacement is transmitted to the connecting end of the lever module and the double-Scott-Russell module through the lever input end, displacement Δx1 in the X direction and displacement Δy1 in the Y direction are respectively generated at the connecting end. The displacement delta x1 enables the Scott-Russell output end to output displacement Δy2 in the Y direction relative to the two ends of the double-Scott-Russell module, the displacement directions of Δy1 and Δy2 are opposite, a small output displacement yout is obtained after superposition, and reduction of the input displacement is achieved.

The linear distance between the lever input end and the lever supporting block 10 is recorded as L1, and the linear distance between the connecting end of the lever module and the half-bridge module and the lever supporting block 10 is recorded as L2. For the lever module, when the actuator 11 inputs the longitudinal displacement of δ, the transverse displacement generated by the connecting end of the lever module and the double-Scott-Russell module is as follows: Δx1 is approximately equal to $\delta L2 \sin(\theta 1)/L1$, and meanwhile, the longitudinal displacement is generated as follows: Δy1 is approximately equal to $\delta L2 \cos(\theta 1)/L1$.

For the double-Scott-Russell module, the transverse displacement Δx1 makes the longitudinal distance between the Scott-Russell output end and the two ends of the double-Scott-Russell module before and after deformation differ by Δy2 which is approximately equal to $\Delta x1/\tan(\theta 3)$.

The output end of the whole mechanism is a Scott-Russell output end, the output displacement of the Scott-Russell output end relative to the base is yout, when Δy2 is larger than Δy1, yout is equal to Δy2−Δy1, and otherwise, yout is equal to Δy1−Δy2.

FIGS. 1A-1C, FIG. 2 and other drawings are combined, and more detailed description is as follows:

Examples of a double-lever module, a half-bridge module with compliant branch chains being a lumped compliance type and a double-Scott-Russell module are respectively shown in FIG. 1A, FIG. 1B and FIG. 1C.

In FIG. 2 to FIG. 8, when the anticlockwise direction is positive and the forward motion module 1 is a double-lever module, $\theta_1$ is recorded as an angle from the horizontal line to the connecting line of the lever supporting block 10 and a joint of the forward motion module 1 and the reverse motion module 2; when the reverse motion module 2 is a half-bridge module, $\theta_2$ is recorded as an angle from the horizontal line to a compliant branch chain in the half-bridge module; when the reverse motion module 2 is a half-bridge module, a joint of the input end 5 of the reverse motion module and the output end 6 of the reverse motion module is connected with a joint of the input end 5 of the reverse motion module and the output end 4 of the forward module, and $\theta_3$ is recorded as an angle from the horizontal line to the connection line; $\theta_1$ and $\theta_2$ are in the range of 0-90 degrees or 90-180 degrees at the same time, and $\theta_1$ and $\theta_3$ are in the range of 90-180 degrees at the same time.

FIG. 2 shows an example that the forward module and the reverse module are a double-lever module and a half-bridge module respectively, and the double-lever module and the half-bridge module are connected through compliant hinges, and FIG. 3 shows the movement effect of the example.

The double-lever module includes lever input end used as the input end of the forward motion module and two lever mechanisms, and the two lever mechanisms are symmetrically arranged on the two sides of the lever input end.

The lever mechanism in FIG. 2 includes a lever output end used as the output end of the forward motion module and a lever supporting block, the lever supporting block is arranged on the outer side of the lever input end, one end of the lever supporting block is fixed, and the other end of the lever supporting block is connected with the lever output end through a compliant hinge.

The half-bridge module includes half-bridge output end used as the output end of the reverse motion module and compliant branch chains used as the input end of reverse motion module, and the two compliant branch chains are symmetrically arranged on the two sides of half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed. The compliant branch chains in the half-bridge module in FIG. 2 are lumped compliance type compliant branch chains, the compliant hinges used by the mechanism are only horizontally and vertically arranged, and $\theta_1$ and $\theta_2$ are in the range of 0-90 degrees at the same time.

The input end of the forward motion module is an actuator input end, and the output end of reverse motion module is a reducer output end.

The lever nodule and the half-bridge module generate differential motion in the Y direction.

As shown in FIG. 2, the invention also discloses the following solution:

A differential compliant displacement reducer with output in the same direction or reverse direction of input, including:
an actuator (11), a forward motion module (1) and a reverse motion module (2) which are sequentially arranged from bottom to top; wherein
both of the forward motion module (1) and the reverse motion module (2) are provided with an input section and an output section;
the forward motion module (1) is compliantly connected with the input section of the reverse motion module (2) through the output section of the forward motion module (1), and the output of the forward motion module (1) is used as the input of the reverse motion module (2);
the actuator (11) provides displacement, and the displacement is input to the input section of the forward motion module (1); and
the input displacement provided by the actuator (11) is the same direction or reverse direction of displacement output by the output section of the reverse motion module (2).

In another embodiment,
the actuator is directly connected with the forward motion module or connected with the forward motion module through a ball and the like.

In another embodiment,
with the joint of the actuator and the forward motion module as the center, the two sides of the forward motion module (1) are sequentially connected with an input section (3) of the forward motion module, an output section (4) of the forward motion module and an input section (5) of the reverse motion module respectively.

In another embodiment,
the two sides of the output section of the reverse motion module (2) are respectively connected with an input section (5) of the reverse motion module.

FIG. 3 is a motion schematic diagram of the embodiment shown in FIG. 2.

The output end of the whole reducer is a half-bridge output end, the output displacement of the half-bridge output end relative to the base is $y_{out}$, and when $\Delta y_2$ is larger than $\Delta y_1$, the output displacement is $y_{out}=\Delta y_2-\Delta y_1$, and the direction of the output displacement is the same as that of the input displacement $\delta$. Otherwise, $y_{out}$ is equal to $\Delta y_1-\Delta y_2$, and the direction is opposite to that of the input displacement $\delta$.

FIG. 4 shows that the forward module and the reverse module are a double-lever module and a half-bridge module respectively, and the double-lever module and the half-bridge module are connected through compliant hinges.

The double-lever module includes a lever input end used as the input end of the forward motion module and two lever mechanisms, and two lever mechanisms are symmetrically arranged on two sides of the lever input end.

The lever mechanism in FIG. 4 includes a lever output end used as the output end of the forward motion module and a lever supporting block, the lever supporting block is arranged on the inner side of the lever input end, the lever input end is located on the outermost layer of the lever mechanism, one end of the lever supporting block is fixed, and the other end of the lever supporting block is connected with the lever output end through a compliant hinge.

The half-bridge module includes a half-bridge output end used as the output end of the reverse motion module and compliant branch chains used as the input end of the reverse motion module, and the two compliant branch chains are symmetrically arranged on the two sides of the half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed. The compliant branch chains in the half-bridge module in FIG. 4 are lumped compliance type compliant branch chains, the compliant hinges used by the mechanism are only horizontally and vertically arranged, and $\theta_1$ and $\theta_2$ are in the range of 90-180 degrees at the same time.

The input end of the forward motion module is an actuator input end, and the output end of reverse motion module is a reducer output end.

The lever nodule and the half-bridge module generate differential motion in the Y direction.

FIG. 5 shows an example that the forward module and the reverse module are a double-lever module and a half-bridge module respectively, and the double-lever module and the half-bridge module are connected through compliant hinges.

The double-lever module includes a lever input end used as the input end of the forward motion module and two lever mechanisms, and the two lever mechanisms are symmetrically arranged on two sides of the lever input end.

The lever mechanism in FIG. 5 includes a lever output end used as the output end of the forward motion module and a lever supporting block, the lever supporting block is arranged on the outer side of the lever input end, one end of the lever supporting block is fixed, and the other end of the lever supporting block is connected with the lever output end through a compliant hinge.

The half-bridge module includes a half-bridge output end used as the output end of the reverse motion module and compliant branch chains used as the input end of the reverse motion module, and the two compliant branch chains are symmetrically arranged on the two sides of the half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed. The compliant branch chains in the half-bridge module in FIG. 5 are lumped compliance type compliant branch chains, the compliant hinges used by the mechanism are obliquely arranged, and $\theta_1$ and $\theta_2$ are in the range of 0-90 degrees at the same time.

The input end of the forward motion module is an actuator input end, and the output end of the reverse motion module is a reducer output end.

The lever nodule and the half-bridge module generate differential motion in the Y direction.

FIG. 6 shows an example that the forward module and the reverse module of the invention are respectively a double-lever module and a half-bridge module, and the compliant branch chain of the half-bridge module is in a distributed compliance type.

The double-lever module includes a lever input end used as the input end of the forward motion module and two lever mechanisms, and the two lever mechanisms are symmetrically arranged on the two sides of the lever input end.

The lever mechanism in the FIG. 6 includes a lever output end used as the output end of the forward motion module and a lever supporting block, the lever supporting block is arranged on the outer side of the lever input end, one end of the lever supporting block is fixed, and the other end of the lever supporting block is connected with the lever output end through a compliant hinge.

The half-bridge module includes a half-bridge output end used as the output end of the reverse motion module and compliant branch chains used as the input end of the reverse motion module, and the two compliant branch chains are symmetrically arranged on two sides of half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed. The compliant branch chains in the half-bridge module in FIG. 6 are distributed compliance type compliant branch chains, and $\theta_1$ and $\theta_2$ are in the range of 0-90 degrees at the same time.

The input end of the forward motion module is an actuator input end, and the output end of the reverse motion module is a mechanism output end.

The lever module and the half-bridge module generate differential motion in the Y direction.

FIG. 7 shows that the forward module and the reverse module are a double-lever module and a half-bridge module respectively, and the double-lever module and the half-bridge module are connected through compliant hinges.

The double-lever module includes a lever input end used as the input end of the forward motion module and two lever mechanisms, and the two lever mechanisms are symmetrically arranged on two sides of the lever input end.

The lever mechanism in the FIG. 7 includes a lever output end used as the output end of the forward motion module and a lever supporting block, the lever supporting block is arranged on the inner side of the lever input end, one end of the lever supporting block is fixed, the other end of the lever supporting block is connected with the lever output end through a compliant hinge, and the lever input end is arranged between the lever supporting block fixing end and the lever output end.

The half-bridge module includes a half-bridge output end used as the output end of the reverse motion module and compliant branch chains used as the input end of the reverse motion module, and the two compliant branch chains are symmetrically arranged on two sides of half-bridge output end.

The compliant branch chain is a lumped compliance type branch chain or a distributed compliance type branch chain, compliant hinges are arranged at the two ends of the lumped compliance type branch chain, the compliant hinges are horizontally, vertically or obliquely arranged, the distributed compliance type branch chain is a whole section of compliant beam, and the compliant beam is a long beam or a reed. The compliant branch chains in the half-bridge module in FIG. 7 are lumped compliance type compliant branch chains, the compliant hinges used by the mechanism are only horizontally and vertically arranged, and $\theta_1$ and $\theta_2$ are in the range of 0-90 degrees at the same time.

The input end of the forward motion module is an actuator input end, and the output end of the reverse motion module is a reducer output end.

The lever module and the half-bridge module generate differential motion in the Y direction.

FIG. 8 shows an example that the forward motion module and the reverse motion module of the invention are a lever module and a double-Scott-Russell module respectively, and the lever module and the double-Scott-Russell module are connected through compliant hinges.

The double-lever module includes the lever input end used as the input end of the forward motion module and two lever mechanisms, and the two lever mechanisms are symmetrically arranged on two sides of the lever input end.

The lever mechanism includes a lever output end used as the output end of the forward motion module and a lever supporting block, the lever supporting block is arranged on the outer side of the lever input end, one end of the lever supporting block is fixed, and the other end of the lever supporting block is connected with the lever output end through a compliant hinge.

The double Scott-Russell module includes a Scott-Russell output end, two Scott-Russell mechanisms and a Scott-Russell connecting block, wherein the Scott-Russell output end serves as the output end of the reverse motion module, the two Scott-Russell mechanisms are symmetrically arranged on the two sides of the Scott-Russell output end, and the lower ends of the two Scott-Russell mechanisms are connected through the Scott-Russell connecting block; and a structure in the Scott-Russell mechanism, which is simultaneously connected with the Scott-Russell output end (namely the output end of the reverse module) and the output end of the forward motion module, is the input end of the reverse motion module.

$\theta_1$ and $\theta_3$ as shown in FIG. 8 are in the range of 90-180 degrees at the same time.

The lever input end is the actuator input end, and the Scott-Russell output end is the reducer output end.

The lever module and the double Scott-Russell module generate differential motion in the Y direction.

The working principle of the invention is as follows: as shown in FIG. 8, firstly, voltage is applied to an actuator connected with the lever input end in advance, the actuator generates input displacement $\delta$ in the Y direction, the input displacement is transmitted to the connecting end of a lever module and a double-Scott-Russell module through the lever input end, displacement $\Delta x_1$ in the X direction and displacement $\Delta y_1$ in the Y direction are generated at the connecting end, and the displacement $\Delta x_1$ enables the Scott-Russell output end to output displacement $\Delta y_2$ in the Y direction relative to the two ends of the double Scott-Russell module, the two displacement directions of $\Delta y_1$ and $\Delta y_2$ are opposite, small output displacement $y_{out}$ is obtained after superposition, and reduction of input displacement is achieved.

The linear distance between the lever input end and the lever supporting block is recorded as $L_1$, and the linear distance between the connecting end of the lever module and the half-bridge module and the lever supporting block is recorded as $L_2$.

For the lever module, when the actuator inputs the longitudinal displacement of $\delta$, the connecting end of the lever module and the double-Scott-Russell module generates transverse displacement $\Delta x_1$ which is approximately equal to $\delta L_2 \sin(\theta_1)/L_1$, and generates longitudinal displacement $\Delta y_1$ which is approximately equal to $\delta L_2 \cos(\theta_1)/L_1$ at same time.

For the double-Scott-Russell module, the transverse displacement $\Delta x_1$ makes the longitudinal distance between the Scott-Russell output end and the two ends of the double-Scott-Russell module before and after deformation differ by $\Delta y_2$ which is approximately equal to $\Delta x_1/\tan(\theta_3)$.

The output end of the whole reducer is a Scott-Russell output end, the output displacement of the Scott-Russell output end relative to the base is $y_{out}$, when $\Delta y_2$ is larger than $\Delta y_1$, the output displacement is $y_{out}=\Delta y_2-\Delta y_1$, and the direction of the output displacement is opposite to that of the input displacement $\delta$; otherwise, you is equal to $\Delta y_1-\Delta y_2$, and the direction is the same as that of the input displacement $\delta$.

It can be understood that for those skilled in the art, they know that various displacement reduction mechanisms disclosed by the embodiments of the invention can be exemplarily made of a whole plate, or can be decomposed into a plurality of parts and assembled after processing respectively, which is not limited to any kind of material or formation mode, and the actuator can exemplarily select a linear actuator, such as a PZT piezoelectric ceramic actuator. What is shown in all the attached drawings is schematic only, which does not mean that the size proportion, relative position, shape, etc. of each component in various displacement reducers are completely limited by the attached drawings. In addition, combined with the accompanying drawings, it can be found that the technical solution disclosed by the invention has the characteristic of symmetry in structure. Compared with the traditional displacement amplification mechanism, the invention can be improved by at least one order of magnitude, for example, to 2 nm or even higher.

Although the preferred embodiments of the invention are described above in combination with the accompanying drawings, the invention is not limited to the above specific embodiments, which are only schematic and not restrictive. Under the guidance of the invention, those skilled in the art can also make many forms without departing from the scope protected by the purpose and claims of the invention, which belong to the protection scope of the invention.

The invention claimed is:

1. A modular differential compliant displacement reducer with output in same direction or reverse direction of input, comprising a forward motion module (1), a reverse motion module (2) and an actuator (11); both of the forward motion module (1) and the reverse motion module (2) are provided with an input end and an output end; an output end (4) of the forward motion module is compliantly connected with an input end (5) of the reverse motion module, and the output of the forward motion module (1) is used as the input of the reverse motion module (2); an input end of the forward motion module is an actuator input end, and an output end of the reverse motion module is a reducer output end; and displacement input provided by the actuator (11) is in the same direction or reverse direction of displacement output of an output end (6) of the reverse motion module.

2. The modular differential compliant displacement reducer with output in the same direction or reverse direction of input according to claim 1, wherein both of the forward motion module (1) and the reverse motion module (2) are of a symmetrical structure; the forward motion module (1) is a double-lever module, and the reverse motion module (2) is a half-bridge module or a double-Scott-Russell module.

3. The modular differential compliant displacement reducer with output in the same direction or reverse direction of input according to claim 1, wherein the output end (4) of the forward motion module and the input end (5) of a reverse motion module are compliantly connected through a compliant hinge with notches in the two sides, or the output end (4) of the forward motion module is directly connected with a compliant beam of the input end (5) of the reverse motion module.

4. The modular differential compliant displacement reducer with output in the same direction or reverse direction of input according to claim 2, wherein the double-lever module comprises a lever input end used as an input end (3) of the forward motion module and two lever mechanisms, and the two lever mechanisms are symmetrically arranged on the two sides of the lever input end.

5. The modular differential compliant displacement reducer with output in the same direction or reverse direction of input according to claim 4, wherein the lever mechanism comprises a lever output end used as the output end (4) of the forward motion module and a lever supporting block (10), the lever supporting block (10) is arranged on the outer side or the inner side of the lever input end, one end of the lever supporting block (10) is fixed, and the other end is connected with the lever output end through a compliant hinge.

6. The modular differential compliant displacement reducer with output in the same direction or reverse direction of input according to claim 2, wherein the half-bridge module comprises a half-bridge output end used as the output end (6) of the reverse motion module and compliant branch chains used as the input end (5) of the reverse motion module, and the two compliant branch chains are symmetrically arranged on the two sides of the half-bridge output end.

7. The modular differential compliant displacement reducer with output in the same direction or reverse direction of input according to claim 6, wherein the compliant branch chain is a lumped compliance type branch chain or a distributed compliance type branch chain, compliant hinges are arranged at the two ends of the lumped compliance type branch chain, the compliant hinges are horizontally, vertically or obliquely arranged, and the distributed compliance type branch chain is a whole section of compliant beam, and the compliant beam is a long beam or a reed.

8. The modular differential compliant displacement reducer with output in the same direction or reverse direction of input according to claim 2, wherein the double-Scott-Russell module comprises a Scott-Russell output end used as the output end (6) of the reverse motion module, two Scott-Russell mechanisms (8) and a Scott-Russell connecting block (9);

the two Scott-Russell mechanisms (8) are symmetrically arranged on the two sides of the Scott-Russell output end, and the lower ends of the two Scott-Russell mechanisms (8) are connected through the Scott-Russell connecting block (9); in the Scott-Russell mechanism (8), the input end (5) of the reverse motion module is connected with the Scott-Russell output end and the output end (4) of the forward motion module at the same time; and the Scott-Russell mechanism (8) comprises two branches, one branch used as the input end (5) of the reverse motion module is a long branch, the other branch is a short branch, and the two ends of each branch are compliant hinges; connecting lines of three ends of the Scott-Russell mechanism (8) form a right triangle, and meanwhile a connecting end of the short branch and the long branch is arranged at the midpoint of a connecting line of the two ends of the long branch.

9. The modular differential compliant displacement reducer with output in the same direction or reverse direction of input according to claim 2, when wherein the counterclockwise direction is positive, and the forward motion module (1) is a double-lever module, $\theta1$ is recorded as an angle from the horizontal line to the connecting line of the lever supporting block (10) and a joint of the forward motion module (1) and the reverse motion module (2); when the reverse motion module (2) is a half-bridge module, $\theta2$ is recorded as an angle from the horizontal line to a compliant branch chain in the half-bridge module; when the reverse motion module (2) is a half-bridge module, a joint of the input end (5) of the reverse motion module and the output end (6) of the reverse module is connected with a joint of the input end (5) of the reverse motion module and the output end (4) of the forward motion module, and $\theta3$ is recorded as an angle from the horizontal line to the connection line; $\theta1$ and $\theta2$ are in the range of 0-90 degrees or 90-180 degrees at the same time, and $\theta1$ and $\theta3$ are in the range of 90-180 degrees at the same time.

10. A modular differential compliant displacement reducer with output in same direction or reverse direction of input, comprising:

an actuator (11), a forward motion module (1) and a reverse motion module (2) which are sequentially arranged from bottom to top; wherein both of the forward motion module (1) and the reverse motion module (2) are provided with an input section and an output section;

the forward motion module (1) is compliantly connected with the input section of the reverse motion module (2) through the output section of the forward motion module (1), and the output of the forward motion module (1) is used as the input of the reverse motion module (2);

the actuator (11) provides displacement, and the displacement is input to the input section of the forward motion module (1); and the input displacement provided by the actuator (11) is in the same direction or reverse direction of displacement output by the output section of the reverse motion module (2).

\* \* \* \* \*